Feb. 8, 1955
K. H. STEENBURGH
2,701,418
DIAL INDICATOR ATTACHMENT
Filed March 3, 1954
2 Sheets-Sheet 1
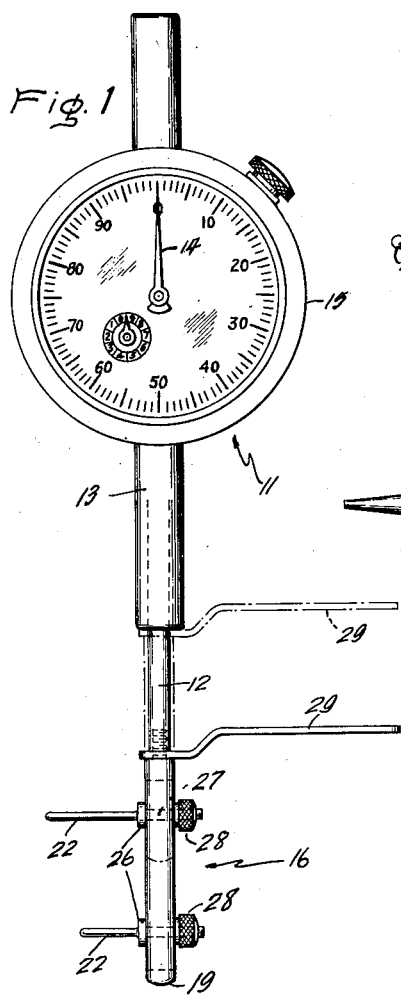
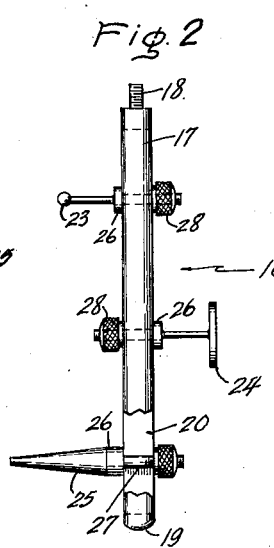
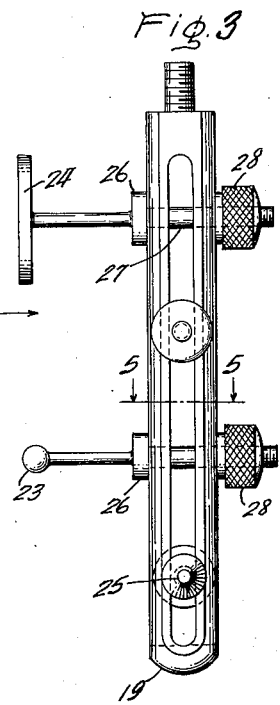
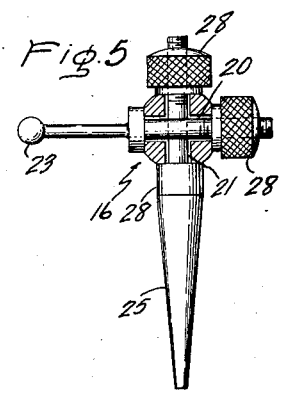
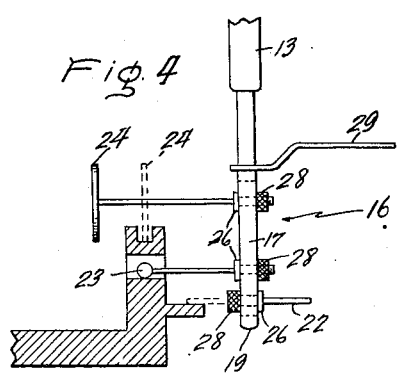
INVENTOR.
Kurt H. Steenburgh,
BY Andros and Smith
His Attorneys.

Feb. 8, 1955  K. H. STEENBURGH  2,701,418
DIAL INDICATOR ATTACHMENT
Filed March 3, 1954  2 Sheets-Sheet 2
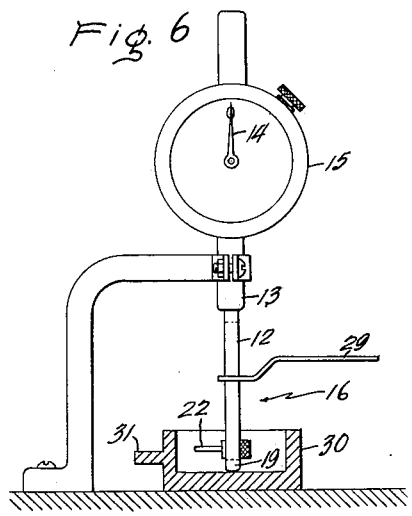
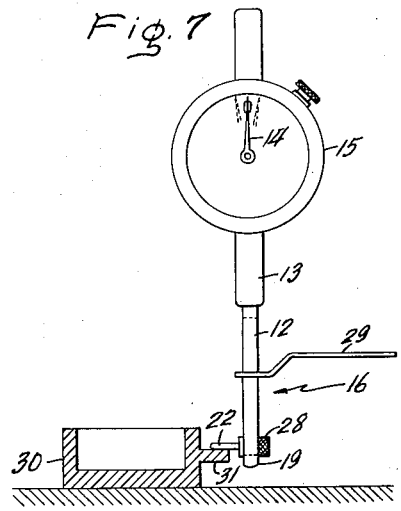
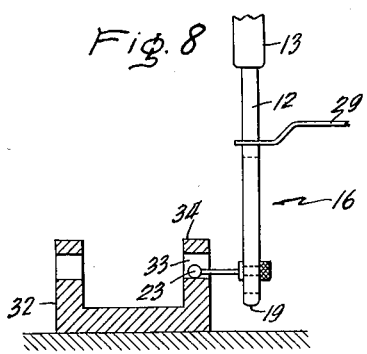
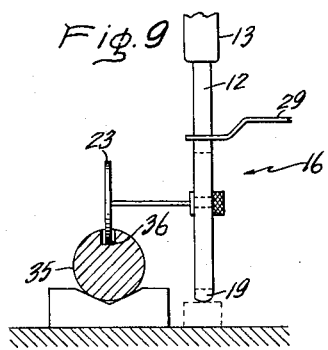
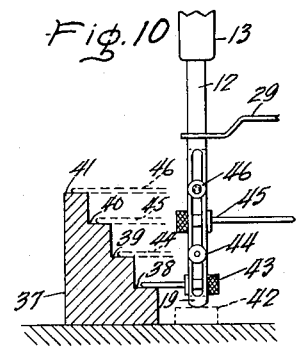
INVENTOR.
Kurt H. Steenburgh,
BY Andros and Smith
His Attorneys.

United States Patent Office 2,701,418
Patented Feb. 8, 1955

2,701,418

DIAL INDICATOR ATTACHMENT

Kurt H. Steenburgh, Schenectady, N. Y.

Application March 3, 1954, Serial No. 413,922

10 Claims. (Cl. 33—172)

This invention relates to improvements in gaging devices of the dial indicator type, having particular reference to an attachment for such a device whereby at least two different gaging operations can be performed on a single work-piece successively by a single handling of said work-piece without resetting the indicator dial, and the provision of such an attachment is a principal object of the invention.

In all industries where inspection gaging operations must be performed on work-pieces of various sizes, shapes and forms, different types of gages, and particularly dial indicator gages having reciprocating gaging stems thereon, are utilized. If, for example, a plurality of different types of gaging operations are to be performed on a single work-piece, the same consequently must be handled a plurality of times. This is time-consuming and thus an expensive procedure and involves other difficulties and disadvantages. It has long been felt in the industry that it would be a distinct improvement if such difficulties and disadvantages could be overcome, and this has now been accomplished by means of the present invention.

Generally, therefore, it is also an object of the invention to provide an attachment for a dial indicator gage which is economic of manufacture, simple, yet sturdy and durable of construction, and in operation, which will operate with relative freedom from wear and tear, and other mechanical difficulties, and is otherwise well suited to the purposes for which it is intended.

More specifically, it is an object of the invention to provide a gaging attachment for use on the reciprocable stem of a dial indicator that comprises a body extension member mountable on the free end of the stem to reciprocate therewith, which member is so constructed and arranged that it is adapted to carry a plurality of gage elements removably mountable thereon, and two separate gaging elements carried by such member, one of which may be mounted at the free tip-end, and the other one, or a plurality, of which may slidably be mounted thereon to extend laterally thereof, in order that at least two, or more, different gaging operations can be performed on a single work-piece successively by a single handling of the work-piece without resetting the indicator dial.

The specific objects of the invention are to provide such a gage-holding extension member co-axially mountable on the free end of the reciprocable stem, such member having one or more elongated transverse slots therein, in which said gaging elements may removably and slidably be mounted extending laterally and angularly thereof; in which a laterally extending lifting member is carried thereby, manually to manipulate the stem and gage elements to set the latter for subsequent gaging operation; and in which said gaging elements are characterized by being of different shapes or configurations, such as, for example, a straight stem, a straight stem terminating in a sphere, a straight stem terminating in a disk, a tapered stem, and the like.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which:

Fig. 1 is an elevational view illustrating a preferred embodiment of the invention;

Fig. 2 is a side elevational view of an attachment further illustrating the invention;

Fig. 3 is a further elevational view, somewhat enlarged, of a modified form of gage-holding mounting;

Fig. 4 is an elevational view illustrating the attachment in operation when gaging a work-piece, a fragmentary portion thereof only being shown in section;

Fig. 5 is a transverse sectional view taken along the lines 5—5 of Fig. 3;

Figs. 6, 7, 8 and 9 illustrate several different types of gaging operations being performed by some of the different types of gaging elements which it is possible to utilize as part of the invention; and Fig. 10 illustrates several different gaging operations being performed by different gaging elements upon a single work-piece.

Referring more particularly to the drawing, there is indicated generally at 11 a conventional type of dial indicator gage having a stem 12 reciprocably mounted in a sleeve 13 to rotate the pointer 14 around the face of the graduated scale on the dial indicator. The peripheral casing 15 is of the type that is rotatable so that if the stem 12 is actuated, for example, whereby the pointer 14 moves to the numeral 10 on the dial, the casing may be rotated so that the zero position can be moved in alignment with the pointer 14 as will more fully appear hereinafter.

In nearly all such dial indicators the reciprocating stem is provided at its tip-end with a removable tip that is screw-threaded therein for replacement or other purposes. In the present invention this tip may be removed, and reused if desired, so that the attachment of the present invention can be secured co-axially to the free end of the stem 12.

Such an attachment is indicated generally at 16. The attachment comprises an elongated body portion, or gage carrying member, 17, and is provided with a screw-threaded stud 18 whereby the same can be screw-threaded into the end of the stem 12 after the removal of the tip as aforesaid. The opposite end of the member 17 can be screw-threaded to receive the removed tip or be provided with its own tip as shown at 19 in its preferred form. The attachment 16 is in co-axial alignment with the stem 12.

The body member 17 has an elongated slot 20 therethrough although the same may be provided with a second elongated slot 21 substantially at right angles to the slot 20, as shown in Fig. 5.

Slidably and removably mounted in the slots 20 and 21 are one or more gaging elements. For example, such gaging elements may take the form of a straight stem 22, a straight stem tipped with a sphere as at 23, a straight stem tipped with a disk 24, and a tapered type of gaging element 25. Each of such gaging elements is provided with an abutting shoulder 26, a shank portion 27 that extends through the slot or slots and preferably is screw-threaded at its end, and preferably a knurled nut 28 carried by the screw-threaded shank to secure the gaging element in selected position.

Also carried by the body member 17, preferably where it is attached to the stem 12, is a laterally extending member 29, whereby manually to raise the stem 12 and attachment 16.

From Figs. 6, 7, 8 and 9, it will at once be obvious that the dial indicator device therein disclosed readily can be utilized to perform different gaging operations on one or more work-pieces by means of the attachment 16, carrying different types of gaging elements. For example, in Fig. 6, the tip 19 which consists of one gaging element is employed for a depth gaging operation in the work-piece 30; and the straight stem gaging element 22 can then be utilized immediately thereafter to gage, for example, a lug 31 on the same work-piece as shown in Fig. 7.

In Fig. 8, the same or another work-piece 32, having an opening 33 in a wall 34 thereof, can be gaged by the sphere 23 of another gaging element if the same is carried by the attachment 16.

In Fig. 9, for example, the disk type of gaging element 23 can be utilized to gage a work-piece 35 having a key-way or slot 36 therein.

The utility of the invention is perhaps best illustrated in Fig. 10 where there is diagrammatically illustrated a work-piece 37 having, for example, several steps or ledges thereon of different heights, as well as, for example, a depth therein, or bottom wall thickness (not shown), of the order of that shown in Fig. 6. Thus, five different gaging operations can be performed by a single handling, or "pass" of the work-piece 37. That is to say, the necessity for performing five different gaging operations with as many different gages, and handling the work-piece as many different times, can be eliminated by performing these operations in a single handling operation. To illustrate, let us assume that it is desired to gage such a work-piece that has a depth of ⅛ inch; and that is stepped, or has ledges, of ¼ inch, ½ inch, ¾ inch and 1 inch, as shown in Fig. 10 at 38, 39, 40 and 41 respectively.

The procedure in setting up the gage elements on the attachment would be as follows:

1. Place a gage block 42 underneath the gaging tip 19, such gage block measuring exactly ⅛ inch. This will cause the pointer 14 to rotate around the graduated dial an equivalent distance. Rotate the peripheral casing 15 until the zero position comes into alignment with the pointer 14;

2. Place a ¼ inch gage block under the gaging member 43, until the same rests thereon, and secure the gaging member in this position.

3. Place a ½ inch gage block under the gaging element 44 until the same rests thereon and secure the same in this position;

4. Place a ¾ inch gage block under the gage element 45 until the same rests thereon and secure this gaging element in position; and 5. Finally place a 1 inch gage block under the gaging element 46 until the same rests thereon and secure this gaging element in position.

Obviously, by properly following the general foregoing procedure, only one setting of the indicator at zero will be necessary. As each gaging operation is performed, the indicator 14, if the particular portion of the work-piece being gaged is perfect, will register at zero, otherwise, it will register plus or minus zero, as the case may be, within the tolerances allowed, that is, so many thousandths above or below zero.

It will thus be seen that the objects hereinbefore set forth may readily and efficiently be obtained; and since certain changes may be made in the above device and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. An attachment for use on the reciprocating stem of a dial indicator, comprising a body extension member mountable on the free end of said stem to reciprocate therewith and so constructed and arranged as to carry a plurality of gaging elements removably mountable thereon; and at least two gaging elements carried by said member, one of which is mounted at the free tip-end, and the other of which is slidably mounted thereon to extend laterally thereof; whereby at least two different gaging operations can be performed on a single work-piece successively by a single handling of said work-piece without resetting the indicator dial.

2. An attachment for use on the reciprocable stem of a dial indicator, comprising an elongated body extension member co-axially mountable on the free end of said stem and having a transverse slot therethrough; and a plurality of gaging elements removably and slidably mounted in said slot and extending laterally thereof; whereby a plurality of different gaging operations can be performed on a single work-piece successively by a single handling of said work-piece without resetting the indicator dial.

3. An attachment for use on the reciprocable stem of a dial indicator, comprising an elongated gage-holding extension member co-axially mountable on the free end of said stem, said member having two elongated transverse slots therein, disposed substantially at right angles to each other; and a plurality of gaging elements of different shapes, to perform different gaging operations, removable and slidably mounted in said slots, extending laterally of said member and substantially at right angles to each other; whereby at least two different gaging operations can be performed on a single work-piece successively by a single handling of said work-piece without resetting the indicator dial.

4. An attachment for use on the reciprocable stem of a dial indicator, comprising an elongated gage-holding extension member co-axially mountable on the free end of said stem, said member having two elongated transverse slots therein, disposed substantially at right angles to each other, a plurality of gaging elements of different shapes, to perform different gaging operations, removably and slidably mounted in said slots, extending laterally of said member and substantially at right angles to each other; and a laterally extending lifting member manually to manipulate said stem and gaging elements to set the latter for subsequent gaging operations; whereby a plurality of different gaging operations can be performed on a single work-piece successively by a single handling of said work-piece without resetting the indicator dial.

5. An attachment as defined in claim 4, and further characterized in that one of said gaging elements constitutes a straight stem.

6. An attachment as defined in claim 4, and further characterized in that one of said gaging elements constitutes a straight stem terminating in a sphere.

7. An attachment as defined in claim 4, and further characterized in that one of said gaging elements constitutes a straight stem terminating in a disk.

8. An attachment as defined in claim 4, and further characterized in that one of said gaging elements constitutes a tapered stem.

9. The combination with a dial indicator gage, having a reciprocable gaging stem, of an attachment comprising a body extension member mountable on the free end of said stem to reciprocate therewith and so constructed and arranged as to carry a plurality of gaging elements removably mountable thereon; and at least two gaging elements carried by said member, one of which is mounted at the free tip-end, and the other of which is slidably mounted thereon to extend laterally thereof; whereby at least two different gaging operations can be performed on a single work-piece successively by a single handling of said work-piece without resetting the indicator dial.

10. The combination with a dial indicator gage, provided with a reciprocating gaging stem, of an attachment comprising an elongated body extension member co-axially mountable on the free end of said stem and having a transverse slot therethrough; and a plurality of gaging elements removably and slidably mounted in said slot and extending laterally thereof; whereby a plurality of different gaging operations can be performed on a single work-piece successively by a single handling of said work-piece without resetting the indicator dial.

No references cited.